(12) United States Patent
Peres et al.

(10) Patent No.: US 7,799,459 B2
(45) Date of Patent: Sep. 21, 2010

(54) INSERTION COMPOUND ABLE TO BE USED AS CATHODIC ACTIVE MATERIAL OF A LITHIUM RECHARGEABLE ELECTROCHEMICAL CELL

(75) Inventors: Jean-Paul Peres, Eysmes (FR); Stephane Gillot, Ambares (FR); Frederic Chouquais, Aubie et Espessas (FR); Claudette Audry, Bruges (FR); Andre Lecerf, Pace (FR)

(73) Assignee: Saft Groupe SA, Bagnolet (FR)

( * ) Notice: Subject to any disclaimer, the term of this patent is extended or adjusted under 35 U.S.C. 154(b) by 391 days.

(21) Appl. No.: 11/753,035

(22) Filed: May 24, 2007

(65) Prior Publication Data

US 2008/0093581 A1 Apr. 24, 2008

(30) Foreign Application Priority Data

May 24, 2006 (FR) .................................. 06 04670

(51) Int. Cl.
*H01M 4/50* (2010.01)
*H01M 4/58* (2010.01)
*H01M 4/52* (2010.01)
*C01G 45/12* (2006.01)
*C01G 51/04* (2006.01)
*C01G 23/04* (2006.01)
*C01G 39/02* (2006.01)

(52) U.S. Cl. .................. 429/231.5; 429/218.1; 429/221; 429/223; 429/224; 429/220; 429/231.1; 429/231.3; 252/182.1; 423/594.1; 423/594.2; 423/594.19; 423/598; 423/599

(58) Field of Classification Search ............... 429/218.1, 429/221, 223, 224, 220, 231.1, 231.3, 231.5; 252/182.1; 423/594.1, 594.2, 594.19, 598, 423/599
See application file for complete search history.

(56) References Cited

U.S. PATENT DOCUMENTS

| 5,962,166 | A | * | 10/1999 | Ein-Eli et al. | ............... | 429/224 |
| 6,337,158 | B1 | | 1/2002 | Nakajima et al. | | |
| 6,709,788 | B2 | * | 3/2004 | Hosokawa et al. | .......... | 429/223 |
| 2002/0192148 | A1 | | 12/2002 | Kweon et al. | | |
| 2003/0211235 | A1 | | 11/2003 | Suh et al. | | |
| 2004/0202938 | A1 | | 10/2004 | Noguchi et al. | | |

FOREIGN PATENT DOCUMENTS

EP 1 311 013 A2 5/2003

OTHER PUBLICATIONS

Preparation and electrochecmical properties of high-voltage cathode materials, $LiM_yNi_{0.5-y}Mn_{1.5}O_4$(M=Fe, Cu, Al, Mg; y—0.0-0.4); Fey, et al.; Journal of Power Sources; pp. 332-345.

Effect of Ti Substitution for Mn on the Structure of $LiNi_{0.5}Mn_{1.5-x}Ti_xO_4$ and Their Electrochemical Properties as Lithium Insertion Material; Kim, et al.; Journal of Electrochemical Society, 151 (11) A1911-A1918 (2004).

* cited by examiner

*Primary Examiner*—Melvin C Mayes
*Assistant Examiner*—Jun Li
(74) *Attorney, Agent, or Firm*—Sughrue Mion, PLLC

(57) ABSTRACT

A compound for use as active material of a positive electrode of a lithium-ion cell. This compound has an average discharge voltage above 4.5V in relation to the Li+/Li couple of approximately 4.7V. The compound includes: a) a spinel-type crystalline phase of formula $Li_aNi_{II}^{0.5-x}Mn^{III}_{2x}Mn^{IV}_{1.5-x-y}M_yO_4$ in which elements Ti and Al, or a mixture of these; $0.8<a<1.3$; $0<x\leq0.15$; $0<y\leq0.15$; b) a cubic crystalline phase of formula $Li_{1-t}Ni_{1+t}O$ in which $0\leq t\leq1$; and c) a rhomboedric crystalline phase of formula $Li_{1-z}Ni_{1+z}O_2$ in which $0\leq z\leq1$.

16 Claims, 4 Drawing Sheets

INSERTION COMPOUND ABLE TO BE USED AS CATHODIC ACTIVE MATERIAL OF A LITHIUM RECHARGEABLE ELECTROCHEMICAL CELL

TECHNICAL FIELD

The invention relates to a compound intended for use as an active material for the positive electrode for a lithium rechargeable electrochemical cell. This compound is suitable for high-voltage operation, in particular at a voltage greater than 4.5 Volts compared with Li/Li$^+$. The lithium rechargeable electrochemical cell incorporating this compound has an improved life span and power capacity.

STATE OF THE ART

The current lithium-ion cell (carbon-based anode and cathode based on doped LiNiO$_2$, LiCoO$_2$, or non-doped LiMn$_2$O$_4$) is limited in terms of mass and volume energy, with values ranging from 160 to 200 Wh/kg and 430 to 500 Wh/l.

Electronic applications, in particular the "portable" type, require more and more energy. Today this energy increase is limited principally by the carbon-based negative electrode (anode) which, although it does have a long life span, is of limited capacity (approximately 300-350 mAh/g reversible). The mass/volume energy of the lithium-ion cell is also limited by the average operating voltage of the active material of the positive electrode (cathode). The average operating discharge voltage of the active material is 3.6V for doped LiNiO$_2$, 3.7V for LiCoO$_2$ and 3.8V for non-doped LiMn$_2$O$_4$. This limitation is basically dictated by the degree of safety of the Li-ion cell when charged.

The market demand for high-energy batteries could therefore be met by the use of higher-capacity novel negative active materials such as those based on Si—C, or those based on intermetallic alloys, but also by positive active materials operating at a higher voltage than 4 V. An increase of 1 volt in the operating voltage of the lithium-ion positive electrode is able, according to the capacity reached (110-130 mAh/g) by the positive electrode, to induce an increase in mass and/or volume energy of 10 to 15% of the combination of positive electrode, separator and negative electrode ("electrochemical stack").

Active materials for the positive electrode of a lithium-ion cell that are suitable for operating at a voltage greater than 4.5 V compared with the Li$^+$/Li couple are known from the prior art. They are called "5V active materials".

For example, patent application FR 2831993 describes a material capable of reversibly inserting lithium and able to be used as a positive active material of a lithium electrochemical cell. This material can operate to a voltage greater than 4.5 V compared with the Li+/Li couple. This material is a lithiated manganese oxide obtained by substituting a fraction of the manganese by the elements M and M' and its crystallographic structure is of the spinel type, i.e. the oxygen ions form a compact cubic type assembly with centred faces, the cations occupying octaedral and tetraedral sites of these assemblies. A typical crystallographic structure is that of magnesium aluminate MgAl$_2$O$_4$ (space group Fd3m).

The formula of this material is:

$$LiMn_{2-x-y}M_xM'_yO_4$$

with x>0; y>0 and x+y>0.5;
M=Ni, Co;
M'=Ti, Al, Co, Mo

The degree of oxidation of the manganese in this material is IV. All the manganese in this material is of oxidation degree IV. The discharge of virtually all the electrochemical capacity of such a material is obtained for a potential greater than 4.5V.

However, an electrochemical cell of lithium-ion type incorporating this positive material has the drawback of displaying mediocre discharge performance under heavy current (or rapid discharge) and a short life span under cyclical conditions of use.

The article "Preparation and electrochemical properties of high-voltage cathode materials, LiM$_y$Ni$_{0.5-y}$Mn$_{1.5}$O$_4$ (M=Fe, Cu, Al, Mg; y=0.0-0.4)" published in Journal of Power Sources 115, (2003), 332-345 describes a spinel of formula LiM$_y$Ni$_{0.5-y}$Mn$_{1.5}$O$_4$ wherein M is selected in the group comprising Fe, Cu, Al and Mg, and y is 0-0.4. Cyclic voltammetric studies show electrochemical activity around 4 V as well as above 4.4 V. While the 4-V activity is related solely to the Mn$^{4+}$/Mn$^{3+}$ couple, the 5V-activity is due to the redox reactions of nickel and the other transition metal ions.

U.S. Pat. No. 6,337,158 describes a lithium secondary battery comprising a positive electrode using, as an active material, a lithium-containing manganese composite oxide with a spinel structure having a composition, during charge and discharge, represented by a formula, Li$_x$Mn$_{2-y-z}$Ni$_y$M$_z$O$_4$ wherein M is at least one element selected from the group consisting of Fe, Co, Ti, V, Mg, Zn, Ga, Nb, Mo and Cu; $0.02 \leq x \leq 1.10$; $0.25 \leq y \leq 0.60$; and $0 < z \leq 0.10$. It is said that the positive electrode of this battery exhibits a substantial discharge potential versus lithium as high as 4.5 V or more.

A lithium-ion electrochemical cell is therefore sought which is:
- suitable for operating at a voltage greater than 4.5 V,
- displaying good performance values during rapid discharge (power capacity),
- providing an improved life span under cyclical conditions.

SUMMARY OF THE INVENTION

The invention proposes a compound capable of being used as active material of a positive electrode of a lithium-ion cell. This compound has a average discharge voltage greater than 4.5V compared with the Li$^+$/Li couple, approximately 4.7V.

This compound comprises:
a) a spinel-type crystalline phase of formula Li$_a$Ni$^{II}_{0.5-x}$Mn$^{III}_{2x}$Mn$^{IV}_{1.5-x-y}$M$_y$O$_4$ M is chosen from the group comprising the elements Ti and Al, or a mixture of these;
0.8<a<1.3;
0<x≦0.15;
0<y≦0.15;
b) a cubic crystalline phase of formula Li$_{1-t}$Ni$_{1+t}$O in which 0≦t≦1; and
c) a rhomboedric crystalline phase of formula Li$_{1-z}$Ni$_{1+z}$O$_2$ in which 0≦z≦1.

The discharge voltage curve of the compound according to the invention shows two discharge plateaus, one at 4V, the other at a potential greater than 4.5V.

According to one embodiment, 0<x≦0.10.

According to one embodiment, the molar percentage of the spinel-type crystalline phase is 75 to 98%, preferably 85 to 96%

According to one embodiment, the molar percentage of the cubic crystalline phase is 1 to 10%, preferably 2 to 6%.

According to one embodiment, the molar percentage the rhomboedric crystalline phase is 0.5 to 15%, preferably 1 to 10%.

According to one embodiment, a=1.

According to another embodiment, $$0.01 \leq \frac{2x}{1.5-x-y} \leq 0.25.$$

According to another embodiment, $$0.05 \leq \frac{2x}{1.5-x-y} \leq 0.10.$$

According to another embodiment, x=0.07 and y<0.09.

Another subject of the invention is the use of a compound according to the invention for the production of an electrode suitable for operating at a potential greater than 4.5 V compared with the Li+/Li couple.

The invention also provides a positive electrode for a lithium electrochemical cell comprising an active material comprising the compound according to the invention.

The invention also provides a lithium electrochemical cell comprising at least one positive electrode according to the invention.

According to one embodiment, in the cell according to the invention the discharge voltage curve shows a plateau at a voltage greater than or equal to approximately 4.5 V, and a plateau at a voltage of approximately 4 V.

This compound is prepared by a process allowing the concomitant formation of the three phases a), b) and c) from a single reaction mixture ("one-pot formation"). This process comprises the stages consisting of:

a) supplying a mixture of NiO, $MnO_2$ or $Mn_3O_4$ and an oxide of metal M; M being chosen from the group comprising the elements Ti and Al, or a mixture of these;

b) grinding the mixture, c) heating the mixture to a temperature greater than 900° C., d) adding a lithium-based compound to the mixture, e) heating the mixture to a temperature comprised between 700° C. and 820° C.

According to one embodiment, the temperature of stage e) is comprised between 730 and 800° C.

According to one embodiment, the lithium-based compound is $Li_2CO_3$.

According to one embodiment, the amount of nickel present in the mixture before synthesis of the spinel phase corresponds to a stoichiometric index of nickel from 0.47 to 0.52.

According to one embodiment, the amount of nickel present in the mixture before synthesis of the spinel phase corresponds to a stoichiometric index of nickel from 0.49 to 0.51.

BRIEF DESCRIPTION OF THE FIGURES

graphite/$LiPF_6$-EC-PC-3DMC/spinel of Example 2
graphite/$LiPF_6$-EC-PC-3DMC/spinel of Example 4.
Power tests on these same elements at D/2 and D.

DETAILED DESCRIPTION OF EMBODIMENTS OF THE INVENTION

Figure 1:
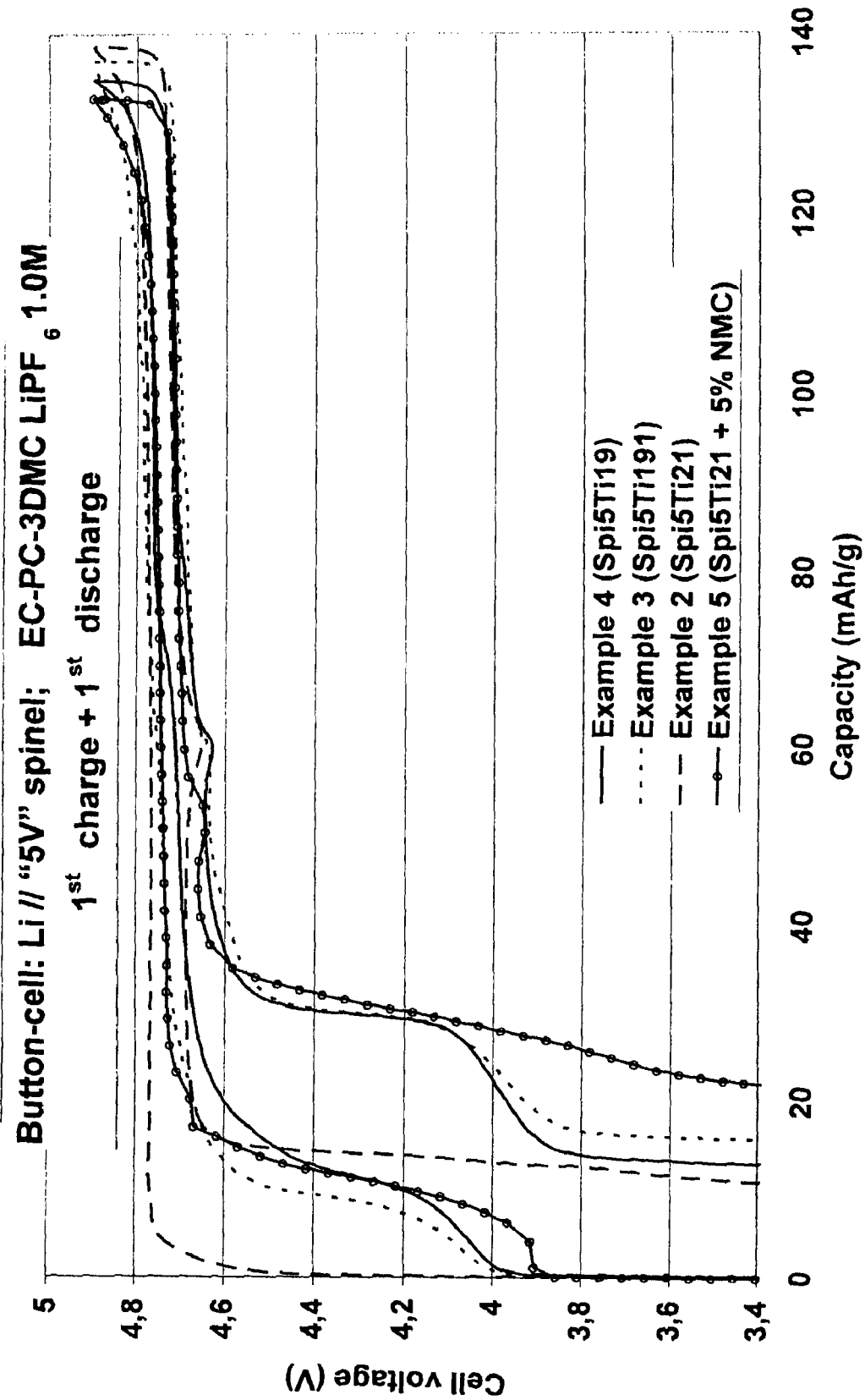
FIG. 1: Electrochemical characterization in button cells (versus Li) of the spinels of examples 2, 3, 4 and 5 ($1^{st}$ cycle, slow discharge rate: C/20).

The compound according to the invention comprises three crystalline phases.

The first phase is a spinel-type crystalline phase of formula $Li_aNi^{II}_{0.5-x}Mn^{III}_{2x}Mn^{IV}_{1.5-x-y}M_yO_4$ in which M is chosen from the group comprising the elements Ti and Al, or a mixture of these;

0.8<a<1.3;

0<x≦0.15;

0<y≦0.15;

$Ni^{II}$, $Mn^{III}$ and $Mn^{IV}$ designate respectively, nickel of oxidation degree 2, manganese of oxidation degree 3 and 4.

According to one embodiment, a=1.

According to one embodiment, $$0.01 \leq \frac{2x}{1.5-x-y} \leq 0.25.$$

According to one embodiment, $$0.05 \leq \frac{2x}{1.5-x-y} \leq 0.10.$$

and preferably x=0.07 and y<0.09.

The electrochemical reactions taking place during the charging of the spinel according to the invention are as follows:

For a potential below 4.5 V in relation to Li, $Mn^{III}$ changes into $Mn^{IV}$ For a potential above 4.5 V in relation to Li, $Ni^{II}$ changes into $Ni^{IV}$.

The charging curve of the spinel according to the invention therefore comprises two parts:

a plateau at a voltage below 4.5V vs. Li$^+$/Li, (approximately 4V), relative to the reaction: $Mn^{III} \rightarrow Mn^{IV}$ ("4V" plateau), a plateau at a voltage above 4.5V vs. Li$^+$/Li, (approximately 4.7V), relative to the reaction: $Ni^{II} \rightarrow Ni^{IV}$ ("5V" plateau).

The length of each plateau is proportional to the quantity of each electrochemically active species. The length of the 4V plateau generally represents 1 to 15% of the total electrochemical capacity of the spinel. The length of the 5V plateau generally represents 85 to 99% of the total electrochemical capacity of the spinel.

The presence of $Mn^{III}$ results in a slightly lowered voltage value compared with the "5V" spinel compound of the prior art, but on the other hand this lower operating voltage limits the oxidation of the electrolyte.

The presence of a plateau at 4V has the advantage of permitting a check on the state of charge of the positive electrode.

The Applicant has noted that the presence of $Mn^{III}$ does not have the effect of increasing the rate of dissolution of the manganese in the electrolyte. The positive electrode preserves its stability and a good life span in cycling conditions. He also noted that the absence of $Mn^{III}$ from a 5V-type spinel compound results in a not very conductive material and therefore in not very satisfactory electrochemical performance values of the cell: poor aptitude for rapid discharge and loss of capacity under cycling.

The second phase of the compound according to the invention is a cubic crystalline phase of formula $Li_{1-t}Ni_{1+t}O$ in which $0 \leq t \leq 1$.

The third phase of the compound according to the invention is a rhomboedric crystalline phase of formula $Li_{1-z}Ni_{1+z}O_2$ in which $0 \leq z \leq 1$.

The second phase and the third phase are termed adjoining phases.

The adjoining phases are not electrochemically active forms. Contrary to the conventional lamellar phases of lithium-ion electrochemistry such as $LiCoO_2$ and doped $LiNiO_2$, the adjoining phases do not, with the exception of the first charge, participate in the increase in electrical capacity of the electrode. They have the effect of improving the electrical conductivity of the compound without interfering with the electrochemistry of the spinel phase.

On the contrary, the conventional lamellar phases of the lithium-ion electrochemistry such as $LiCoO_2$ and doped $LiNiO_2$ are electrochemically active and deteriorate at high potential (4.9 V compared with $Li^+/Li$).

The three crystalline phases of the compound according to the invention are obtained by a process enabling them to be produced simultaneously, starting from a single reaction mixture. This process is therefore a "one-pot" process.

The process for preparation of the compound of the invention comprises the following stages:

a) a mixture of NiO, $MnO_2$ or $Mn_3O_4$ and an oxide of metal M are provided; M being chosen from the group comprising the elements Ti and Al, or a mixture of these. For example $TiO_2$ and/or $Al_2O_3$ can be used.

b) the mixture is ground and optionally screened, c) the mixture is heated to a temperature above 900° C., preferably 950° C. The heating allows a spinel promoter to be synthesized.

d) a lithium-based compound such as lithium carbonate $Li_2CO_3$ is added to the mixture.

e) the mixture is heated to a temperature comprised between 700° C. and 820° C. in order to realize the lithiation of the promoter.

According to one embodiment, the amount of nickel present in the mixture before synthesis of the spinel phase corresponds to a stoichiometric index of nickel from 0.47 to 0.52, preferably from 0.49 to 0.51.

A heating temperature comprised between 700° C. and 820° C. at stage e) is preferably chosen to obtain the compound according to the invention. Heating to a temperature comprised between 700° C. and 820° C., preferably between 730° C. and 800° C., allows on the one hand the formation of the spinel phase a) which is deficient in nickel and rich in manganese III and on the other hand the concomitant formation of the adjoining phases b) $Li_{1-t}Ni_{1+t}O$ and c) $Li_1, Ni_{1+z}O_2$.

During heating, a migration of a fraction "x" of the amount of nickel initially present in the mixture occurs from the spinel phase to the adjoining phases b) $Li_{1-t}Ni_{1+t}O$ and c) $Li_{1-z}Ni_{1+z}O_2$. This explains the deficit of nickel in spinel phase a) of the compound of the invention. This deficit is represented by the value of 0.5−x for the stoichiometric index of nickel which is less than 0.5.

It was noted that the proportion of manganese III in the spinel phase was proportional to the heating temperature of stage e). However, heating above 830° C. or more causes degradation of the structure of the spinel phase to a greater or lesser extent.

The percentage of $Mn^{III}$ generally represents from 1 to 15% of the $Mn^{IV}$.

By way of example:

for a synthesis realized at 750° C.: the ratio $Mn^{III}/Mn^{IV}$ is equal to 0.10 (x=0.07).

for a synthesis realized at 800° C.: the ratio $Mn^{III}/Mn^{IV}$ is equal to 0.15 (x=0.10).

According to one embodiment, the invention does not relate to a mode of preparation of a spinel-type compound in which the adjoining phases would be mixed with the spinel phase after this has been obtained, i.e. an ex-situ addition of the adjoining phases.

The examples below show that ex-situ addition of the adjoining phases gives less satisfactory results than when they form in-situ.

The applicant noted that the presence of $Mn^{III}$ increased the intrinsic electrical conductivity of the compound and induced the electrochemical behaviour in two plateaus as described above.

The length of the plateau of the compound therefore comprises two parts. A first part at approximately 4V represents from 1 to 15% of the total electrochemical capacity. A second part at approximately 4.7V represents from 85 to 99% of the total electrochemical capacity.

The $Mn^{III}$ level can be assessed by oxidation-reduction assay with Mohr's salt $Fe(NH_4)_2(SO_4)_2$ in a strongly acidic medium. A test sample of spinel of known mass is placed in an Erlenmeyer flask. A known volume of a titrated solution of Mohr's salt and 6 N sulphuric acid are added. A nitrogen stream is bubbled into the stoppered Erlenmeyer flask. The mixture is heated until it has totally dissolved. During the oxidation-reduction reaction, reduction of the $Mn^{IV}$ and $Mn^{III}$ species to $Mn^{II}$ and the oxidation of the $Fe^{II}$ to $Fe^{III}$ take place. After cooling the mixture, the excess of Mohr's salt that has not reacted is analysed with a titrated solution of potassium dichromate $K_2Cr_2O_7$.

The detection of the cubic $Li_{1-t}Ni_{1+t}O$ and rhomboedric $Li_{1-z}Ni_{1+z}O_2$ phases is possible by X-ray diffraction. These cubic $Li_{1-t}Ni_{1+t}O$ and rhomboedric $Li_{1-z}Ni_{1+z}O_2$ phases are easily differentiable from NiO or doped $LiNiO_2$ or $LiCoO_2$ by 2θ rays position and by Rietveld refinement of the X-ray diffraction profile.

The spinel phase obtained by this process presents an improved intrinsic electrical conductivity. The combination of the $Mn^{III}$ rich spinel phase with the adjoining phases allows an electrochemically active compound to be obtained which can be used for the production of an electrode suitable for operation at a potential greater than 4.5V compared with $Li^+/Li$. When the compound is used as active material of a positive electrode of a lithium cell, the loss of capacity of this cell during cycling is smaller.

A subject of the invention is also a positive electrode of a lithium rechargeable electrochemical cell containing, as electrochemically active material, the compound as previously described. This compound has the property of reversibly inserting the lithium.

The electrode is generally constituted by a conductive support serving as a current collector and at least one layer containing the active material. This layer is made by depositing on the support a paste containing the electrochemically active material, a polymer binder, a diluent and optionally conductive additives.

The binder can contain one or more of the following components: polyvinylidene difluoride (PVdF) and its copolymers, polytetrafluoroethylene (PTFE), polyacrylonitrile, methyl or butyl polymethacrylate, polyvinyl chloride, polyvinylformal, amide block polyesters and polyethers, polymers of acrylic acid, methacrylic acid, acrylamide, itaconic acid, sulphonic acid, elastomers and cellulose compounds.

The process for producing an electrode containing the compound described previously comprises the following stages. The binder is placed in a solvent in the form of a solution or a suspension. To form a paste, the powdery active material is added to the solution or suspension and optionally production auxiliaries such as for example a thickener. The viscosity of the paste is adjusted and at least one face of a current collector is covered with paste to form an active layer. The collector covered with said active layer is dried and calendered to form the electrode.

The current collector is preferably a two-dimensional conductive support, such as a solid or perforated carbon- or metal-based band, for example of copper, aluminium, nickel, steel, stainless steel or aluminium. Preferably, the positive electrode collector is of aluminium and the negative electrode collector is of copper or of aluminium. Advantageously, the negative collector is of aluminium. In the case of over discharge or inversion of the cell, short-circuiting by copper dendrites is thus avoided when the collector is of copper.

The present invention also relates to a lithium rechargeable electrochemical cell of which the mass and volume energies are improved by the use of a high discharge voltage cathodic active material.

The cell according to the invention has a discharge voltage curve with a plateau at a voltage above or equal to approximately 4.5 V and a plateau at a voltage of approximately 4 V.

The negative electrode (anode) is a lithium insertion compound chosen from a carbon-containing material and a mixed oxide of lithium and a transition metal. The anodic active material can be chosen from a carbon-containing material such as graphite, coke, carbon black and vitreous carbon and a mixed oxide of lithium and a transition metal such as nickel, cobalt or titanium. It can also be a Si—C or Sn—C composite or an intermetallic alloy.

The positive electrode and the negative electrode, or anode during discharge, frame a separator and are impregnated with electrolyte.

The electrolyte is a standard electrolyte in the art of lithium-ion cells. It can be constituted by a solution of a lithium-conducting salt dissolved in a non-aqueous solvent. This solvent can be a solvent or a mixture of solvents chosen from the usual organic solvents, in particular saturated cyclic carbonates, unsaturated cyclic carbonates, non-cyclic carbonates, alkyl esters.

The lithium-conducting salt can be lithium perchlorate $LiClO_4$, lithium bis oxalatoborate LiBOB, lithium hexafluoroarsenate $LiAsF_6$, lithium hexafluorophosphate $LiPF_6$, lithium tetrafluoroborate $LiBF_4$, lithium trifluoromethanesulphonate $LiCF_3SO_3$, lithium trifluoromethanesulphonimide $LiN(CF_3SO_2)_2$ (LiTFSM), lithium trifluoromethanesulphonemethide $LiC(CF_3SO_2)_3$ (LiTFSM) or lithium bisperfluoroethylsulphonimide $LiN(C_2F_5SO_2)_2$ (BETI).

The compound according to the invention can also be used in the positive electrode of an electrochemical cell of lithium polymer type.

The electrochemical cell according to the invention is particularly suitable as an energy source for portable, space, aeronautical and telecommunications applications, powering of electric and hybrid vehicles, industrial applications or emergency lighting.

The following examples illustrate the invention without limiting it.

EXAMPLES

A) Examples of Preparation of 5V Spinels

The physico-chemical and electrochemical characteristics of the compounds obtained in the following examples 1 to 5 are shown in Table 1.

Example 1

According to the Prior Art

The spinel compound of Example 1 was synthesized by first preparing a precursor at 950° C. The precursor was made starting from 0.77 mole of NiO and 0.747 mole of $Mn_3O_4$, that is 2.23 mole of Mn.

The spinel compound does not contain titanium.

Lithiation of the precursor was then carried out at 700° C. with $Li_2CO_3$.

The percentage of manganese having oxidation degree IV in relation to the total manganese is 100%.

Example 2

According to the Prior Art

The spinel compound of Example 2 was synthesized by first preparing a precursor at 950° C. The precursor was made starting from 0.75 mole of NiO, 2.15 mole of $MnO_2$ and 0.10 mole of $TiO_2$. The precursor obtained was $Ni_{0.75}Mn_{2.15}Ti_{0.1}O_4$.

Lithiation of the precursor was then carried out at 700° C. with $Li_2CO_3$. At a temperature of 700° C., the spinel compound $LiNi^{II}_{0.50}Mn^{IV}_{1.42}Ti^{IV}_{0.08}O_4$ was obtained. The stoichiometric index of nickel in the spinel compound is 0.50.

The synthesized spinel compound contains titanium of which the stoichiometric index is 0.08.

The percentage of manganese with oxidation degree IV in relation to the manganese total is 100%.

The disappearance of the NiO phase present in Example 1 can be noted, titanium favoring the incorporation of the nickel in the spinel phase at 700° C.

Example 3

According to the Invention

The spinel compound of Example 3 was synthesized by first preparing a precursor at 950° C. The precursor was made starting from 0.75 mole of NiO, 2.15 mole of $MnO_2$ and 0.10 mole of $TiO_2$. The precursor obtained was $Ni_{0.75}Mn_{2.15}Ti_{0.1}O_4$.

Lithiation was carried then out at 750° C. with $Li_2CO_3$. The spinel compound of formula $LiNi^{II}_{0.43}Mn^{III}_{0.14}Mn^{IV}_{1.35}Ti^{IV}_{0.08}O_4$ was obtained. It should be noted that as the lithiation temperature is higher than 700°

C., the spinel phase contains less nickel (stoichiometric index of nickel of 0.43 instead of 0.50 in Example 2) and contains more $Mn^{III}$.

The $Mn^{III}/Mn^{IV}$ ratio is 0.10. The nickel separates from the spinel material but forms lithiated phases (Li—Ni—O system).

Example 4

According to the Invention

The starting compounds are the same as for Example 3 but lithiation was carried out at a temperature of 800° C. instead of 750° C. The spinel compound contains titanium of which the stoichiometric index is 0.08.

The $Mn^{III}/Mn^{IV}$ ratio is 0.15. An additional increase in temperature causes even more nickel to leave the spinel phase (stoichiometric index of nickel of 0.4 instead of 0.43 in Example 3) and increases the quantity of $Mn^{III}$ in the spinel.

Example 5

Not According to the Invention

The compound of Example 2 is mixed with 5% of adjoining phase $LiNiO_2$ doped with Co—Mn to verify the effect of such an ex-situ addition during production of the electrode as opposed to in-situ during the synthesis of the spinel.

TABLE I

| Characteristics | Example 1 | Example 2 Synthesis temperature | Example 3 |
|---|---|---|---|
|  | 700° C. | 700° C. | 750° C. |
| Structural refinement |  |  |  |
| Spinel formula | $LiNi^{II}_{0.50}Mn^{IV}_{1.50}O_4$ | $LiNi^{II}_{0.50}Mn^{IV}_{1.42}Ti^{IV}_{0.08}O_4$ | $LiNi^{II}_{0.43}Mn^{III}_{0.14}Mn^{IV}_{1.35}Ti^{IV}_{0.08}O_4$ |
| $Mn^{III}/Mn^{IV}$ | ε | ε | 0.10 |
| Spinel (%) | 96.8 | 97.9 | 94.3 |
| NiO | 0.3 | — | — |
| Cubic $Li_{1-t}ni_{1+t}O$ | 2.7 | 1.5 | 3.8 |
| Rhomboedric $Li_{1-z}ni_{1+z}O_2$ | 0.2 | 0.6 | 1.9 |
| Electrochemistry vs Li |  |  |  |
| Rever. capacity (mAh/g) | 133 | 134 | 129 |
| Irrev. capacity (mAh/g) | 11 | 10 | 16 |
| Capacity loss (%-cycle) | 0.10 | 0.34 | 0.08 |
| % capacity C/10 vs C/20 | 97.8% | 97.2% | 98.9% |
| % capacity C/5 vs C/20 | 92.1% | 91.4% | 97.9% |
| Electrochemistry/graphite |  |  |  |
| Mn (ppm) after 4 cycles | 360 | 460 | 90 |

| Characteristics | Example 4 Synthesis temperature | Example 5 |
|---|---|---|
|  | 800° C. |  |
| Structural refinement |  |  |
| Spinel formula | $LiNi^{II}_{0.40}Mn^{III}_{0.20}Mn^{IV}_{1.32}Ti^{IV}_{0.08}O_4$ | Example 2 + 5% $LiNiO_2$ (rhomboedric) (NMC) |
| $Mn^{III}/Mn^{IV}$ | 0.15 |  |
| Spinel (%) | 88.2 |  |
| NiO | — |  |
| Cubic $Li_{1-t}ni_{1+t}O$ | 3.4 |  |
| Rhomboedric $Li_{1-z}ni_{1+z}O_2$ | 8.4 |  |
| Electrochemistry vs Li |  |  |
| Rever. capacity (mAh/g) | 124 | 120 |
| Irrev. capacity (mAh/g) | 13 | 22 |
| Capacity loss (%-cycle) | 0.10 | 0.22 |
| % capacity C/10 vs C/20 | 98.9% | 96.9% |
| % capacity C/5 vs C/20 | 95.9% | 91.6% |

TABLE I-continued

| Electrochemistry/graphite | | |
|---|---|---|
| Mn (ppm) after 4 cycles | 80 | 100 |

B) Electrochemical Characterization of the Compounds Prepared

The "5V" spinel compounds synthesized have been used as cathodes for Li-ion type cells. Button cell [metal Li// "5V" spinel] characterizations were carried out, as well as whole-cell (4/5A) characterizations, against negative materials of the graphite type.

The positive electrodes produced from "5V" spinel comprise:
86% "5V" spinel
4% Y50A (soot)
4% UF2 (graphite) and
6% PVDF The salts used are $LiPF_6$ and LiBOB. The solvent is a mixture of carbonates chosen from ethylene carbonate (EC), propylene carbonate (PC), dimethyl carbonate (DMC), diethyl carbonate (DEC), vinylidene carbonate (VC).

Figure 2:
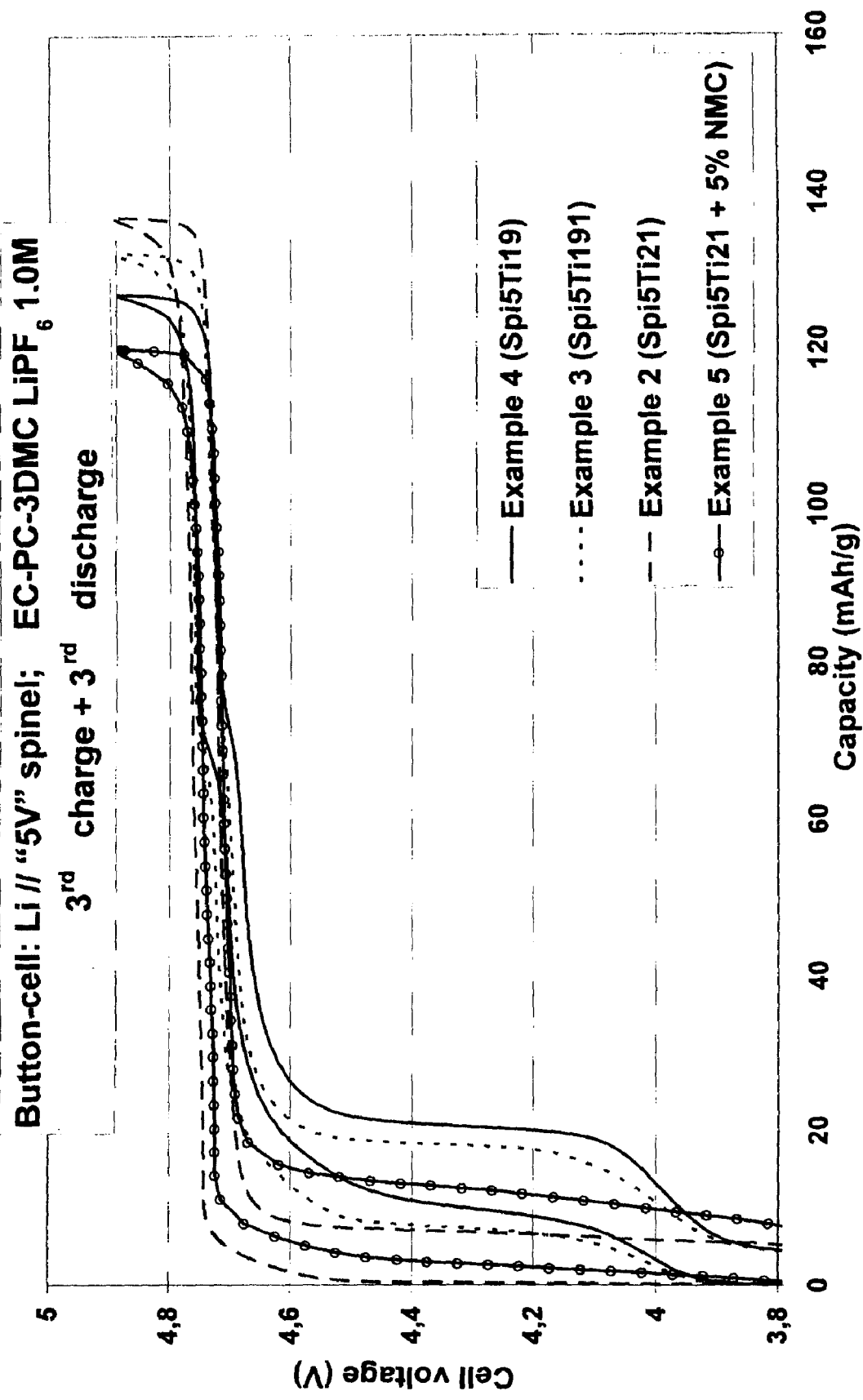
FIG. 2: electrochemical characterization in button cells (versus Li) of the spinels of examples 2, 3, 4 and 5 ($3^{rd}$ cycle, slow discharge rate: C/20).
Figure 3:
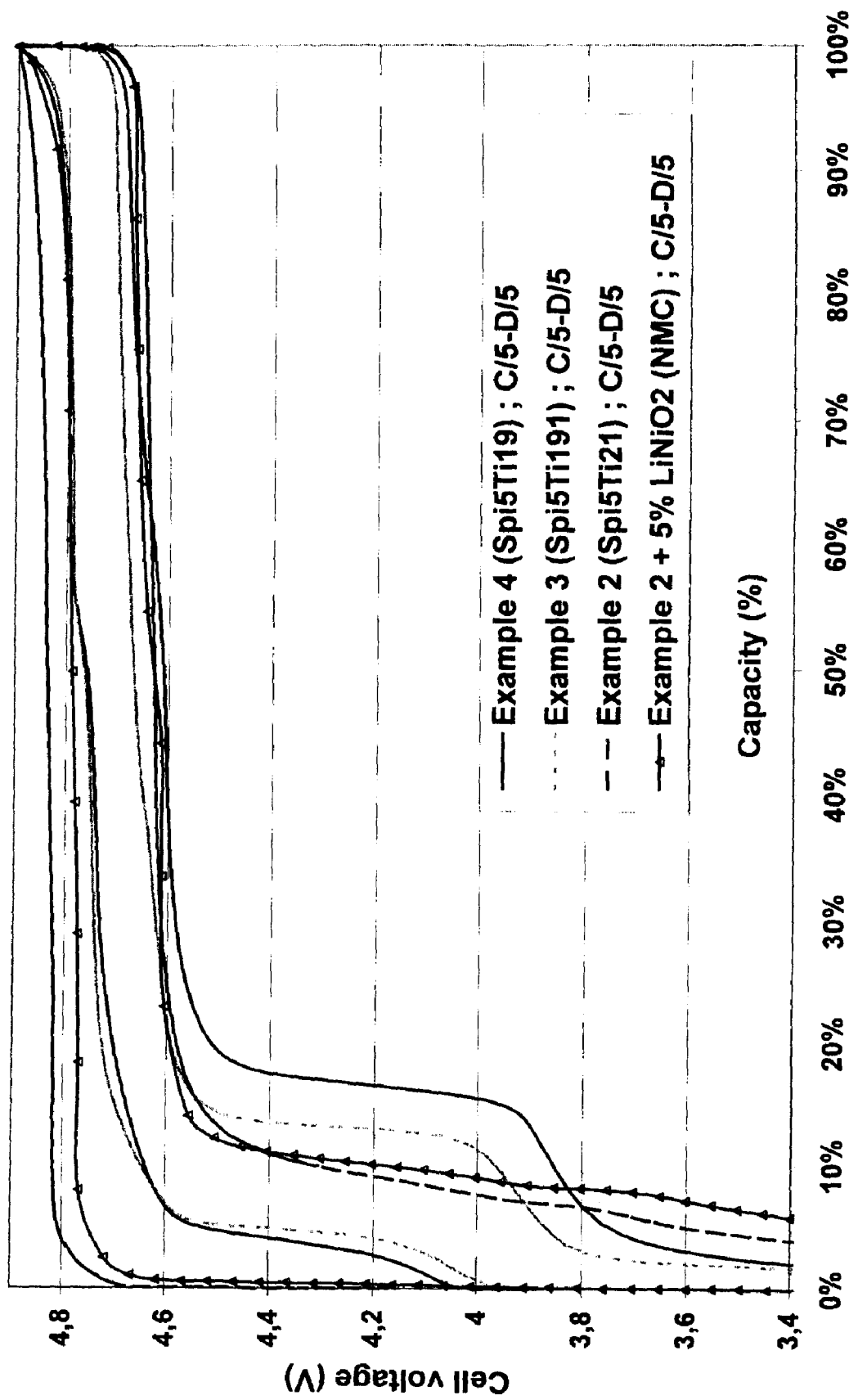
FIG. 3: electrochemical characterization in button cells (versus Li) of the spinels of examples 2, 3, 4 and 5 ($10^{th}$ cycle, rapid discharge rate: C/5). Respective capacities adjusted to 100%.

The results of the button cell [Li metal// "5V" spinel] characterization tests are shown in FIGS. 1, 2 and 3.

Figure 4:
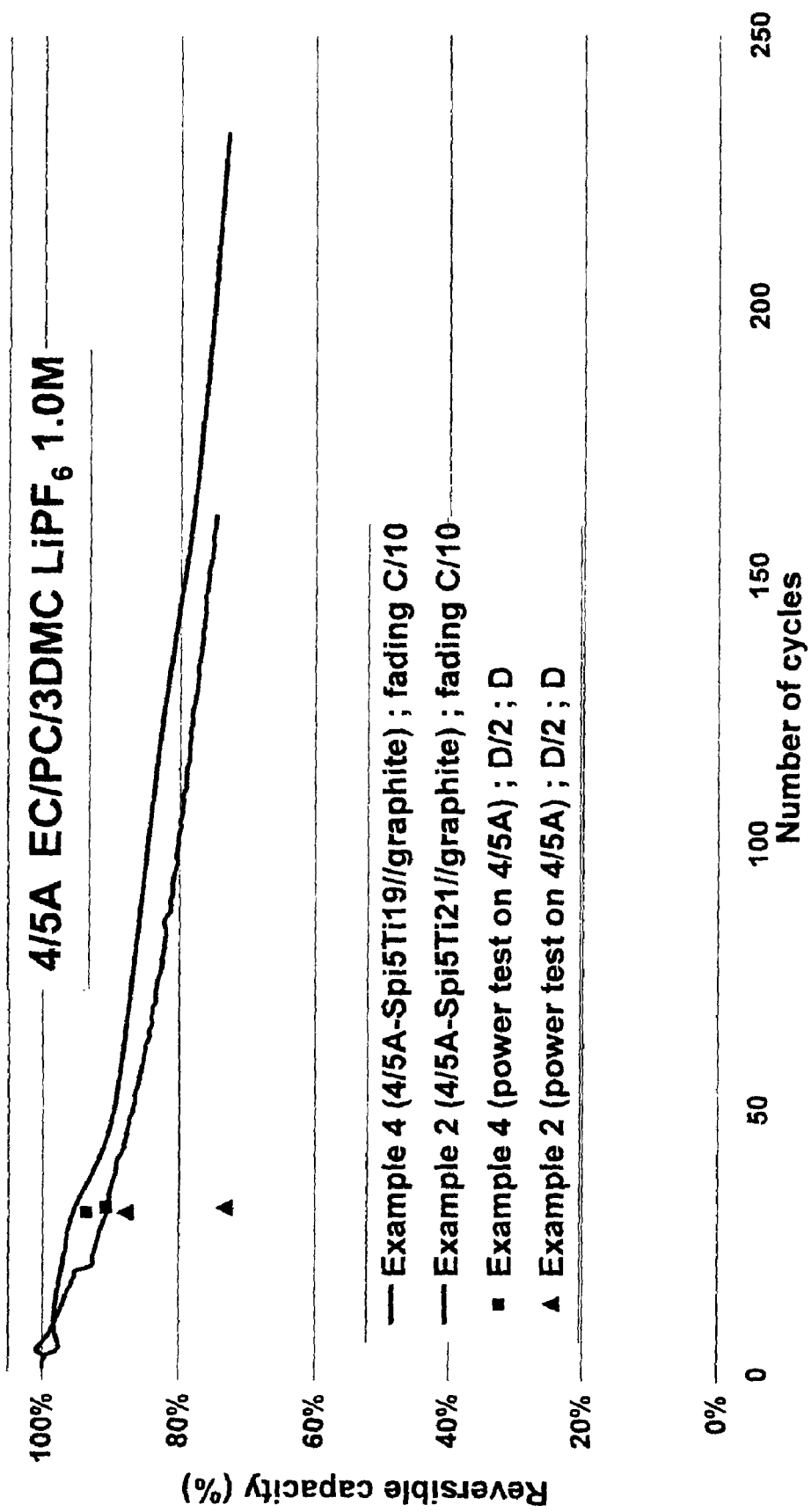
FIG. 4: long-duration cycles (discharge C/10, ambient temperature) of elements 4/5 A of electrochemical definitions.

The complete cells of 4/5A type were subjected to a long-duration cycling test in order to estimate their life span. This test comprises slow discharges at the rate of C/10. At the $30^{th}$ cycle, a rapid-discharge test at D/2 and D was performed. The results of the characterization tests of these complete cells (4/5A) are shown in FIG. 4 and Table 2.

C) Results

1) Characterization of the Electrodes

The cycling characteristics of electrodes comprising the compounds of examples 2 to 5 (versus Li) are shown in FIG. 1 (C/20 discharge, 1st cycle), FIG. 2 (C/20 discharge, 3rd cycle) and FIG. 3 (C/5 discharge).

Table 1 compares the ratios between the capacity discharge at discharge rate C/10 and the capacity discharge at rate C/20 for examples 1-5. It also compares the ratios between the capacity discharge at discharge rate C/5 and the capacity discharge at rate C/20.

The capacity discharge at rate C/10 is greater for examples 3 and 4 according to the invention than that of examples 1, 2 and 5 not according to the invention. The difference in performance values between examples 3 and 4 and examples 1, 2 and 5 is even more significant for a more rapid C/5 discharge. The restored capacities for a C/5 discharge in are respectively, 97.9% and 95.9% for examples 3 and 4, while they are respectively only 92.1%, 91.4% and 91.6% for examples 1, 2 and 5.

Table 1 also shows the manganese content measured after cycling the compounds for 4 cycles. The manganese content measured in the electrolyte is representative of the stability of the compound during cycling. A high manganese content indicates low stability of the compound.

The compounds of examples 1 and 2 contain a cubic crystalline $Li_{1-t}Ni_{1+t}O$ phase and a rhomboedric crystalline $Li_{1-z}Ni_{1+z}O_2$ phase but do not contain $Mn^{III}$. The manganese content measured is 360 and 460 ppm respectively; which is high in comparison with examples 3 and 4.

The compounds of examples 3 and 4 contain $Mn^{III}$, a cubic crystalline $Li_{1-t}Ni_{1+t}O$ phase and a rhomboedric crystalline $Li_{1-z}Ni_{1+z}O_2$ phase. The manganese content measured is 90 and 80 ppm respectively, i.e. approximately 4 times lower than examples 1 and 2. The presence of $Mn^{III}$, but also of adjoining cubic $Li_{1-t}Ni_{1+t}O$ and/or rhomboedric $Li_{1-z}Ni_{1+z}O_2$ phases reduces the loss of capacity during cycling and therefore improves the life span under cycling. The presence of $Mn^{III}$ and adjoining phases causes a slight decrease in the reversible capacity.

The charge/discharge curves of examples 3 and 4 according to the invention indicate the presence of two plateaus, one at approximately 4V and the other at 4.7V.

The addition of 5% of $LiNiO_2$ phase to the spinel material of Example 2 improves electronic conductivity in the first cycle (FIG. 1), but not sufficiently to provide the electrode with good conductivity at a rapid charge/discharge rate (C/5, FIG. 3). Moreover, the destruction of the $LiNiO_2$ phase ($Li_{1-z}Ni_{1+z}O_2$ for z=1) at high voltage (4.9V) results in a marked increase in the irreversibility of the first electrochemical cycle, with a total loss of activity at "4V" intrinsic to the $LiNiO_2$ phase ($Li_{1-z}Ni_{1+z}O_2$ for z=1). In fact, the "4V" plateau noted during charging is not found during discharging, unlike the spinel of examples 3 and 4, where the "4V" plateau relative to the reaction $Mn^{III} \leftarrow Mn^{IV}$ is found during charging and during discharging (FIG. 2). Consequently, the observed reversible capacity is smaller (120 mAh/g).

The effect of the addition of adjoining phases ex-situ does not give such good performance values as in the invention, where the adjoining phases are produced in-situ.

2) Cell Life Span

The 4/5A cell comprising the active material of Example 2, not according to the invention, can be cycled for approximately 100 cycles. The loss of capacity is 20% after these 100 cycles.

The 4/5A cell comprising the active material of Example 4, according to the invention, can be cycled for approximately 150 cycles for the same loss of capacity, which represents an increase in life span of 50%.

Table 2 compares the capacities of these two 4/5A cells during a rapid-discharge test at rates D/2 and D. The loss of cycling capacity is greater for the cell comprising the active material of Example 2 than for the cell of Example 4.

The cycling life span and the suitability for rapid discharge of the cells according to the invention is therefore improved.

TABLE 2

| graphite/LiPF$_6$-EC-PC-3DMC/spinel of ex. 2 4/5A: graphite/spinel of Example 2 | | |
|---|---|---|
| | Q/g (mAh/g) | Q/Q$_{C/10}$ |
| C/10 | 118 | 100% |
| D/2 | 114 | 97% |
| D | 96 | 81% |

| graphite/LiPF$_6$-EC-PC-3DMC/spinel of ex. 4 4/5A: graphite/spinel of Example 4 | | |
|---|---|---|
| | Q/g (mAh/g) | Q/Q$_{C/10}$ |
| C/10 | 119 | 100% |
| D/2 | 117 | 98% |
| D | 113 | 95% |

The invention claimed is:

1. Compound comprising:
 a) a spinel-type crystalline phase of formula $Li_a Ni^{II}_{0.5-x} Mn^{III}_{2x} Mn^{IV}_{1.5-x-y} M_y O_4$ in which M is chosen from the group comprising the elements Ti and Al, or a mixture of these;
 $0.8 < a < 1.3$;
 $0 < x \leq 0.15$;
 $0 \leq y \leq 0.15$;
 b) a cubic crystalline phase of formula $Li_{1-t}Ni_{1+t}O$ in which $0 \leq t \leq 1$, the molar percentage of which is 2 to 10%; and
 c) a rhomboedric crystalline phase of formula $Li_{1-z}Ni_{1+z}O_2$ in which $0 \leq z \leq 1$, the molar percentage of which is 1 to 15%.

2. Compound according to claim 1, in which $0 < x \leq 0.10$.

3. Compound according to claim 1, in which 20 the molar percentage of the spinel-type crystalline phase is 75 to 98%, preferably 85 to 96%.

4. Compound according to claim 1, in which the molar percentage of the cubic crystalline phase is 2 to 6%.

5. Compound according to claim 1, in which the molar percentage the rhomboedric crystalline phase is 1 to 10%.

6. Compound according to claim 1, in which $a=1$.

7. Compound according to claim 1, in which $$0.01 \leq \frac{2x}{1.5-x-y} \leq 0.25.$$

8. Compound according to claim 7, in which $$0.05 \leq \frac{2x}{1.5-x-y} \leq 0.10.$$

9. Compound according to claim 8, in which $x=0.07$ and $y<0.09$.

10. Positive electrode for a lithium electrochemical cell comprising an active material comprising the compound according to claim 1.

11. Lithium electrochemical cell comprising at least one positive electrode according to claim 10.

12. Cell according to claim 11, the discharge voltage curve of which has a plateau at a voltage greater than or equal to approximately 4.5 V, and a plateau at a voltage of approximately 4 V.

13. Process for producing the compound of claim 1 comprising the steps of:
 a) providing a mixture of NiO, $MnO_2$ or $Mn_3O_4$, and an oxide of metal M; M being chosen from the group comprising the elements Ti and Al, or a mixture of these; the amount of nickel present in the mixture before synthesis of the compound of the invention corresponding to a stoichiometric index of nickel from 0.47 to 0.51,
 b) grinding the mixture,
 c) heating the mixture to a temperature above 900° C.,
 d) adding a lithium-based compound to the mixture, and
 e) heating the mixture to a temperature comprised between 700° C. and 820° C.

14. Process according to claim 13, in which 5 the temperature of step e) is between 730 and 800° C.

15. Process according to claim 13, in which the lithium-based compound is $Li_2CO_3$.

16. Process according to claim 13, wherein the amount of nickel present in the mixture before synthesis of the spinel corresponds to a stoichiometric index of nickel preferably from 0.49 to 0.51.

* * * * *